(12) United States Patent
Yukawa

(10) Patent No.: US 12,739,909 B2
(45) Date of Patent: Sep. 15, 2026

(54) COMMUNICATION APPARATUS, CONTROL METHOD, AND STORAGE MEDIUM

(71) Applicant: CANON KABUSHIKI KAISHA, Tokyo (JP)

(72) Inventor: Mitsuyoshi Yukawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 340 days.

(21) Appl. No.: 18/189,109

(22) Filed: Mar. 23, 2023

(65) Prior Publication Data

US 2023/0232483 A1 Jul. 20, 2023

Related U.S. Application Data

(63) Continuation of application No. PCT/JP2021/034700, filed on Sep. 22, 2021.

(30) Foreign Application Priority Data

Sep. 28, 2020 (JP) ................................ 2020-162160

(51) Int. Cl.
*H04W 76/15* (2018.01)
*H04B 7/024* (2017.01)
*H04W 84/12* (2009.01)

(52) U.S. Cl.
CPC ............ *H04W 76/15* (2018.02); *H04B 7/024* (2013.01); *H04W 84/12* (2013.01)

(58) Field of Classification Search
CPC ............................... H04W 76/15; H04B 7/024
See application file for complete search history.

(56) References Cited

U.S. PATENT DOCUMENTS 11,025,329 B2 * 6/2021 Takano ................. H04L 5/0064
11,160,008 B2 * 10/2021 Sugaya ................. H04W 48/08
11,202,312 B2 * 12/2021 Nakamura .......... H04W 74/006
(Continued)

FOREIGN PATENT DOCUMENTS

CN 101268660 A 9/2008
CN 101459953 A 6/2009
(Continued)

OTHER PUBLICATIONS

Xu Gang, Research on Access Points Based on 802.11 a/b/g, Master's Thesis, Bejing University of Posts and Telecommunications, Mar. 2006, English abstract on fifth page

*Primary Examiner* — Chandrahas B Patel
(74) *Attorney, Agent, or Firm* — Canon U.S.A., Inc. IP Division

(57) ABSTRACT

In a state in which a connection is established between a communication apparatus and a first other communication apparatus while a connection is not established between the communication apparatus and second other communication apparatuses, first information shared by the first other communication apparatus and the second other communication apparatuses in terms of the second other communication apparatuses is received. In a case where the received first information is included in a first field included in a received predetermined frame and indicating a transmission source of the predetermined frame, a data field after the first field of the predetermined frame is read.

11 Claims, 6 Drawing Sheets

(56) References Cited

U.S. PATENT DOCUMENTS

| | | | | |
|---|---|---|---|---|
| 11,456,897 | B2 * | 9/2022 | Iwasaki | H04B 7/0617 |
| 2017/0026151 | A1 | 1/2017 | Adachi | |
| 2020/0045555 | A1 | 2/2020 | Huang | |
| 2020/0305006 | A1 | 9/2020 | Chen | |
| 2021/0368391 | A1 | 11/2021 | Fujimori | |
| 2021/0392502 | A1 | 12/2021 | Ouchi | |

FOREIGN PATENT DOCUMENTS

| | | | |
|---|---|---|---|
| CN | 103380577 | A | 10/2013 |
| CN | 109845335 | A | 6/2019 |
| CN | 110730050 | A | 1/2020 |
| JP | 2017539116 | A | 12/2017 |
| JP | 201850133 | A | 3/2018 |
| JP | 2020141306 | A | 9/2020 |
| WO | 2018/078994 | A1 | 5/2018 |
| WO | 2020175051 | A1 | 9/2020 |

* cited by examiner

COMMUNICATION APPARATUS 101 Sharing AP
COMMUNICATION APPARATUS 102 Shared AP1
COMMUNICATION APPARATUS 103 Shared AP2
STA_01
COMMUNICATION APPARATUS 100 STA_11
STA_12
STA_21
CONNECTION BETWEEN AP AND STA
S501
MULTI-AP SETUP
S502
TRANSMISSION OF INFORMATION ON APs SHARED IN MULTI-AP SETUP
S503
FRAME TRANSMISSION
S504
S505
DETERMINATION OF WHETHER TO PERFORM FRAME READING

COMMUNICATION APPARATUS, CONTROL METHOD, AND STORAGE MEDIUM

CROSS-REFERENCE TO RELATED APPLICATIONS

This application is a Continuation of International Patent Application No. PCT/JP2021/034700, filed Sep. 22, 2021, which claims the benefit of Japanese Patent Application No. 2020-162160, filed Sep. 28, 2020, both of which are hereby incorporated by reference herein in their entirety.

TECHNICAL FIELD

The present disclosure relates to a communication apparatus configured to perform wireless communication.

BACKGROUND ART

The IEEE 802.11 standard series is known as a wireless LAN (Local Area Network) communication standard. IEEE is an abbreviation for Institute of Electrical and Electronics Engineers, and the IEEE 802.11 standard series includes standards such as IEEE802.11a/b/g/n/ac/ax etc.

In IEEE 802.11ax described in PTL 1 includes a standard that allows an improvement in the communication speed under congestion conditions in addition to achieving a high peak throughput. As a successor standard to IEEE 802.11ax, IEEE 802.11be (hereinafter referred to as 11be) is being developed.

In 11be, a technology is being studied that allows a plurality of APs (Access Points) to cooperate with each other in performing data communication with STAs (Stations) so as to achieve an improved throughput.

CITATION LIST

Patent Literature

PTL 1: Japanese Patent Laid-Open No. 2018-50133

A frame transmitted by an AP in wireless communication includes a field containing information indicating a transmission source. According to a conventional technique, based on information included in the field and information on an AP whose connection has been established by the STA, the STA determines whether or not to read information following the field.

However, in multi-AP communication planned to be supported by 11be, a plurality of APs participate in communication, but APs have not established connections with all STAs participating in the communication, and there is a possibility that an STA receives a frame from an AP with which the STA has not established a connection.

In this case, the frame includes, as information on the transmission source in the field, information on the AP with which the connection has not been established, which can cause a possibility that the STA does not read information following the above-described field and thus the STA does not read a data field included in the frame.

SUMMARY OF DISCLOSURE

In view of the above, it is an object of the present disclosure to make it possible for a communication apparatus to read a data field of a frame to be read even when the frame is transmitted from an apparatus with which a connection is not established.

To achieve the above object, in an aspect of the present disclosure, there is provided a communication apparatus including a reception unit configured to receive a first predetermined frame transmitted from a first other communication apparatus to the communication apparatus, the first predetermined frame including, in a data field, first information related to a second other communication apparatus shared between the first other communication apparatus and the second other communication apparatus, wherein the first other communication apparatus has established a connection with the communication apparatus while the second other communication apparatus has not established a connection with the communication apparatus, and a reading unit configured such that in a case where the reception unit receives a second predetermined frame whose transmission source is a communication apparatus different from the first other communication apparatus and a value of a first field included in the second predetermined frame and indicating the transmission source of the second predetermined frame matches the first information shared by the first other communication apparatus as a result of the communication apparatus receiving the first predetermined frame, the reading unit reads a data field included in the second predetermined frame after the first field.

Further features of the present disclosure will become apparent from the following description of exemplary embodiments with reference to the attached drawings.

DESCRIPTION OF EMBODIMENTS

Embodiments of the present disclosure are described in detail below with reference to the accompanying drawings. Note that embodiments described below are provided by way of example only, and the scope of the present disclosure is not limited by these embodiments.

Figure 1:
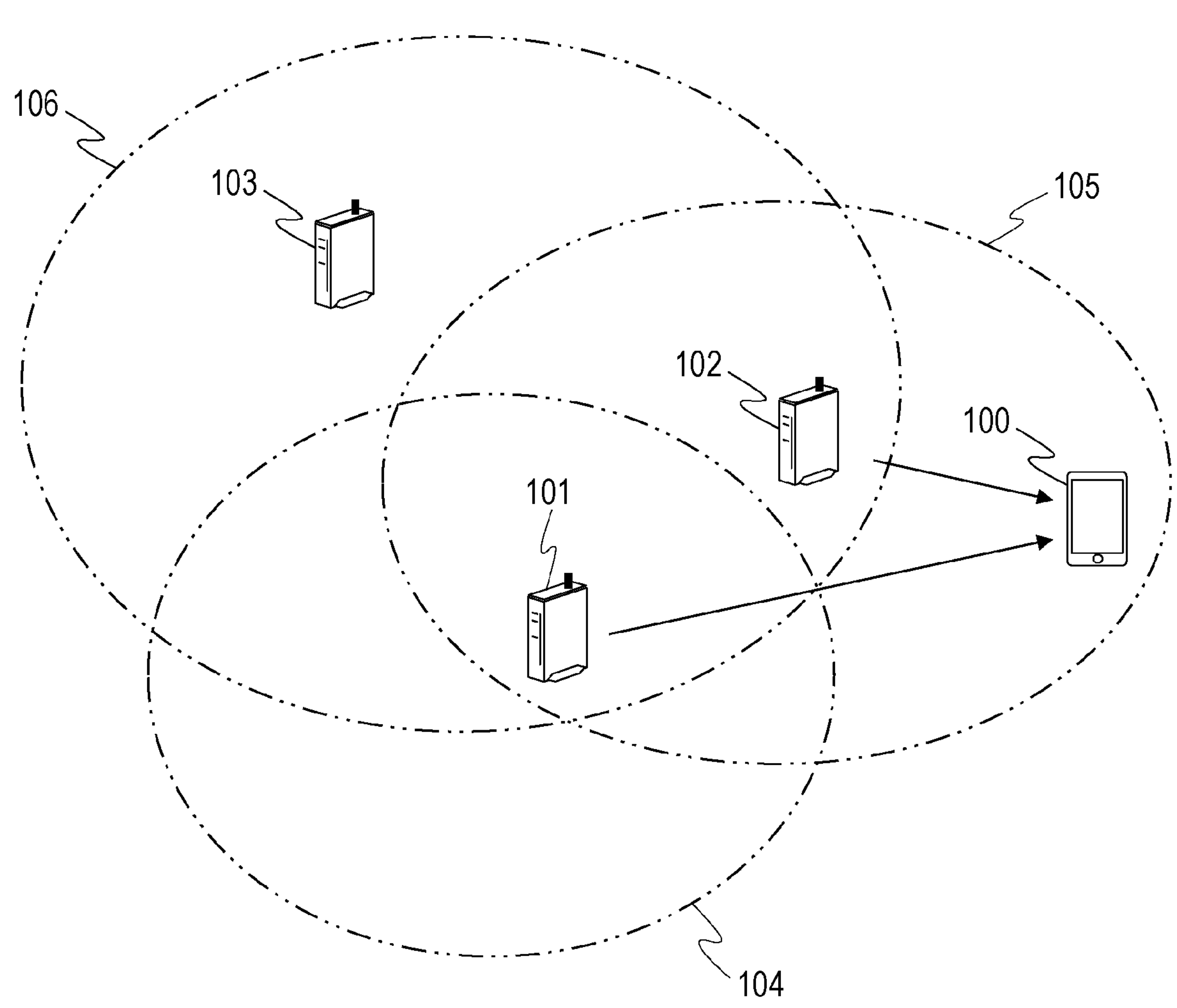
FIG. 1 is a diagram illustrating a configuration of a network to which a communication apparatus 100 belongs.

FIG. 1 illustrates a configuration of a network in which a communication apparatus 100 according to an embodiment participates. The communication apparatus 100 is a station (STA) capable of communicating with a communication apparatus 102 and responsible for participating in a wireless network 105. A communication apparatus 101 is an access point (hereinafter referred to as an AP) that has a role of building a wireless network 104, a communication apparatus 102 is an AP that constructs a wireless network 105, and a communication apparatus 103 is an AP that constructs a wireless network 106. In the present embodiment, the communication apparatus 101 functions as a sharing AP that manages other APs, and the communication apparatuses 102 and 103 are shared APs that operate under the management of the master AP. An example of multi-AP communication in which a plurality of APs operate is a distributed MIMO technology based on a MIMO (Multi-Input Multi-Output) technology, which uses a plurality of transmission and reception antennas on the same channel at the same time. In the distributed MIMO, in an environment where a plurality of APs and a plurality of STAs exist, information on the communication state and information on the state of each AP are shared by the plurality of APs, and data is sent from the APs to the STAs at the same timing. By performing the cooperation among the plurality of APs in the above-described manner, it becomes possible to increase the number of spatial streams compared to the case where the communication is performed by a single AP, which can result in an improvement in throughput. Each of the communication apparatus 100 to 103 is capable of performing wireless communication according to the IEEE 802.11be standard. Note that IEEE is an abbreviation for Institute of Electrical and Electronics Engineers. The communication apparatuses 100 to 103 can communicate in the frequency bands of 2.4 GHZ, 5 GHZ, and 6 GHZ. In the communication, the communication apparatuses 100 to 103 can use bandwidths of 20 MHz, 40 MHz, 80 MHz, 160 MHz, and 320 MHZ.

By executing OFDMA communication according to the IEEE 802.11be standard, the communication apparatuses 100 to 103 can realize multi-user (MU) communication in which signals of a plurality of users are multiplexed. OFDMA stands for Orthogonal Frequency Division Multiple Access. In the OFDMA communication, a part of the divided frequency bands (RU, Resource Unit) is allocated to each STA such that there is no overlap and the carrier waves of the respective STAs are orthogonal. This makes it possible for the APs to communicate with a plurality of STAs in parallel.

It is assumed above that the communication apparatuses 100 to 103 support the IEEE 802.11be standard. Note that in addition to or instead of the IEEE 802.11be standard, the communication apparatuses 100 to 103 may support the legacy standard prior to the IEEE 802.11be standard. More specifically, the communication apparatuses 100 to 103 may support at least one of the IEEE 802.11a/b/g/n/ac/ax standards and successor standards. In addition to the IEEE 802.11 standard series, other communication standards such as Bluetooth (registered trademark), NFC, UWB, ZigBee, and MBOA may be supported. UWB is an abbreviation for Ultra Wide Band, and MBOA is an abbreviation for Multi Band OFDM Alliance. NFC is an abbreviation for Near Field Communication. UWB includes wireless USB, wireless 1394, WiNET, etc. Moreover, a communication standard for wired communication such as a wired LAN may be supported.

Specific examples of the communication apparatuses 100 to 103 include, but are not limited to, wireless LAN routers, personal computers (PCs), etc. Specific examples of the communication apparatus 100 include, but are not limited to, a camera, a tablet device, a smartphone, a PC, a portable telephone, a video camera, etc. Although the wireless network shown in FIG. 1 includes three APs and one STA, the numbers of APs and STAs are not limited thereto.

Figure 2:
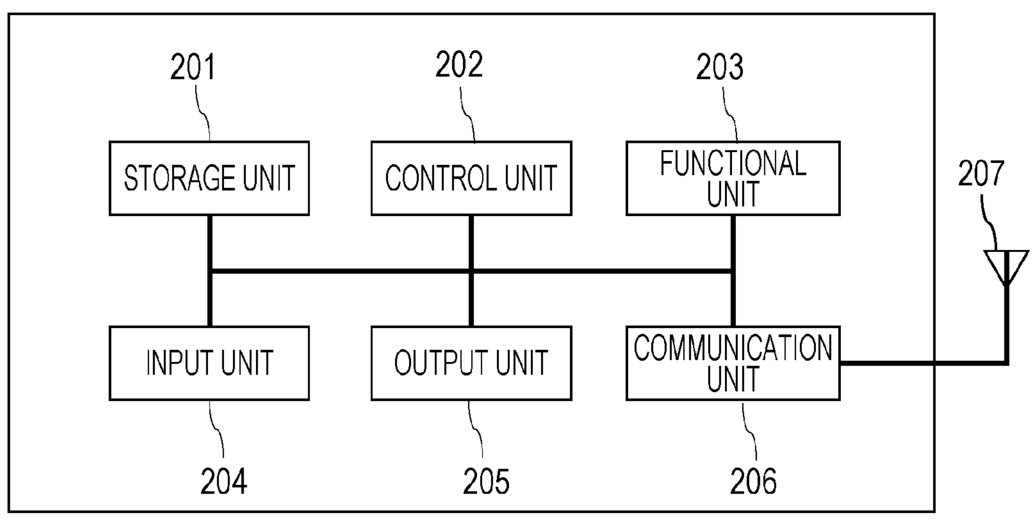
FIG. 2 is a diagram illustrating a hardware configuration of communication apparatuses 100 to 103.

FIG. 2 illustrates an example of a hardware configuration of the communication apparatus 101 according to the present embodiment. The communication apparatus 101 includes a storage unit 201, a control unit 202, a functional unit 203, an input unit 204, an output unit 205, a communication unit 206, and an antenna 207. Note that the communication apparatuses 100, 102, and 103 each also have a hardware configuration similar to that of the communication apparatus 101.

The storage unit 201 is realized using a memory such as a ROM, a RAM or the like, and functions to store computer programs for performing various operations described later and various pieces of information such as a communication parameter for wireless communication. ROM is an abbreviation for Read Only Memory, and RAM is an abbreviation for Random Access Memory. As the storage unit 201, in addition to memories such as a ROM and a RAM, a storage medium such as a flexible disk, a hard disk, an optical disk, a magneto-optical disk, a CD-ROM, a CD-R, a magnetic tape, a non-volatile memory card, a DVD, or the like may be used. The storage unit 201 may include a plurality of memories or the like.

The control unit 202 includes one or more processors such as a CPU, an MPU or the like, and controls the entire communication apparatus 101 by executing a computer program stored in the storage unit 201. CPU is an abbreviation for Central Processing Unit, and MPU is an abbreviation for Micro Processing Unit. Note that the control unit 202 may control the entire communication apparatus 101 by a cooperation between a computer program stored in the storage unit 201 and an OS (Operating System). The control unit 202 also generates data and a signal to be transmitted in communication with another communication apparatus. The control unit 202 may include a plurality of processors such as a multi-core processor, and may control the entire communication apparatus 101 by the plurality of processors. The control unit 202 also controls the functional unit 203 to perform a particular process such as wireless communication, imaging, printing, projection, or the like. The functional unit 203 is hardware by which the communication apparatus 101 executes the particular process.

The input unit 204 accepts various operations from a user. The output unit 205 provides various outputs to the user via a monitor screen or a speaker. Here, the output from the output unit 205 may be information displayed on the monitor screen, audio information output from the speaker, a vibration, or the like. Note that both the input unit 204 and the output unit 205 may be realized in one module such as a touch panel. The input unit 204 and the output unit 205 may be integrated with the communication apparatus 101 or may be provided separately from the communication apparatus 101.

The communication unit 206 controls wireless communication according to the IEEE 802.11be standard. In addition to the IEEE 802.11be standard, the communication unit 206 may control the wireless communication according to other IEEE 802.11 standard series, and/or may control wired communication such as a wired LAN. By controlling the antenna 207, the communication unit 206 transmits and receives a wireless signal for wireless communication generated by the control unit 202.

Note that in a case where the communication apparatus 101 supports the NFC standard, the Bluetooth standard, etc., in addition to the IEEE 802.11be standard, the communication apparatus 101 may control wireless communication according to these communication standards. In a case where the communication apparatus 101 is capable of executing wireless communication according to a plurality of communication standards, communication units 206 and antennas 207 may be provided separately for the respective communication standards. The communication apparatus 101 communicates data such as image data, document data, and video data with the communication apparatus 100 via the communication unit 206.

Figure 3:
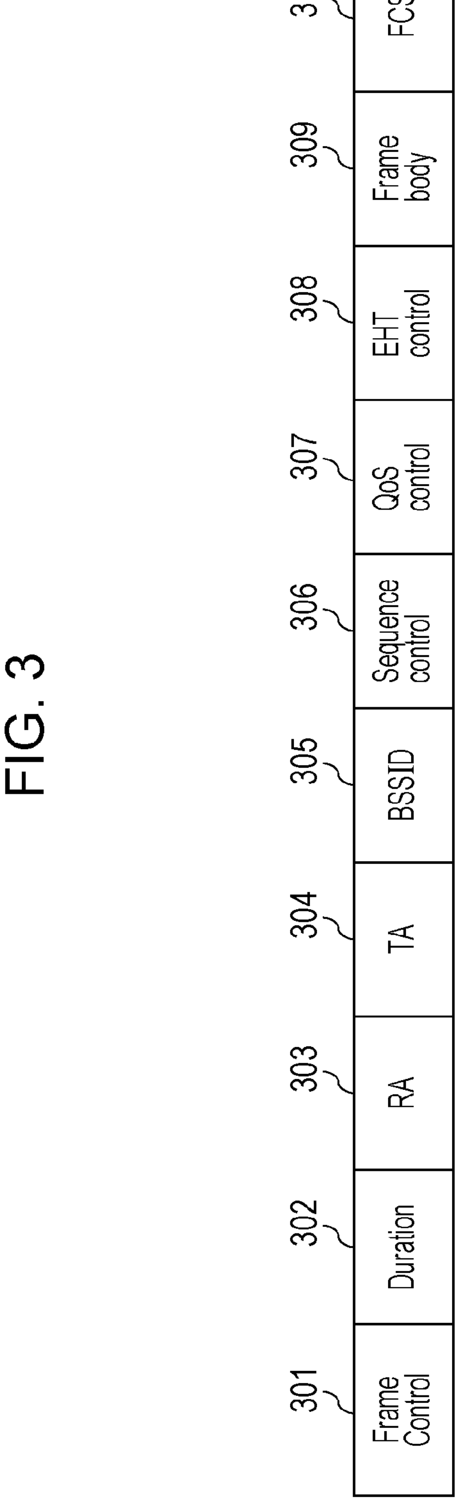
FIG. 3 is a diagram illustrating a frame format of a MAC frame.

FIG. 3 illustrates a frame format of a MAC frame. This conforms to a format specified in the IEEE 802.11 series. That is, it includes a frame control field 301, a duration field 302, an RA field 303, and a TA field 304 arranged from the beginning. Here, RA of the RA field 303 is an abbreviation for Receiver Address, and TA of the TA field 304 is an abbreviation for Transmitter Address. The RA field 303 indicates information on a destination of the frame, and the TA field 304 indicates information on the transmission source of the data frame. In the present embodiment, when the information in the TA field 304 matches the MAC address of an AP participating in multi-AP communication which will be described later, the data field of the frame is read.

Figure 4:
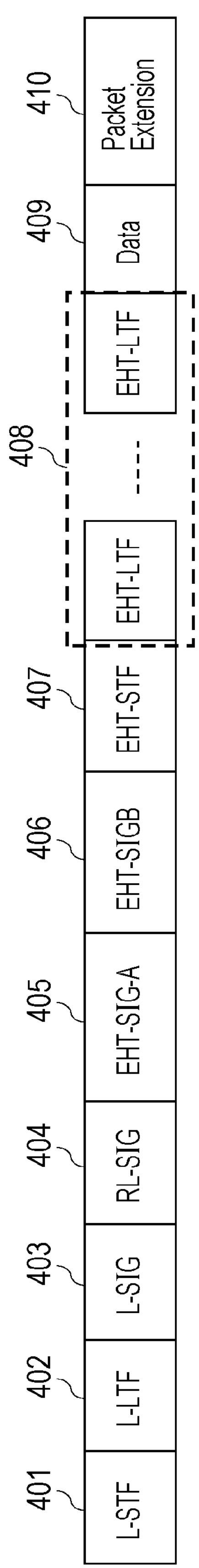
FIG. 4 is a diagram illustrating PPDU according to the IEEE802.11be standard.

FIG. 4 illustrates a PPDU (Physical layer (PHY) Protocol Data Unit) according to the IEEE 802.11be standard. It includes, in a starting part of a frame, L (Legacy)-STF 401, L-LTF 402, and L-SIG 403 that are backward compatible with the IEEE 802.11a/b/g/n/ax standards. L-STF 401 is used for detecting a PHY frame signal, performing automatic gain control (AGC, Automatic Gain Control), performing timing detection, and/or the like. L-LTF 402 placed immediately after L-STF 701 is used for high-precision synchronization of frequency/time, acquisition of propagation channel information (CSI), and/or the like. Here, CSI is an abbreviation for Channel State Information. L-SIG 403, located immediately after L-LTF 402, is used to transmit control information including information on a data transmission rate and a PHY frame length. Legacy devices according to the IEEE 802.11a/b/g/n/ax standards are capable of decoding data in various legacy fields (L-STF 401, L-LTF 402, L-SIG 403) described above. Following the various legacy fields described above, there are fields of RL-SIG 404, EHT-SIG-A 405, EHT-SIGB 406, EHT-STF 407, EHT-LTF 408, a data field 409, and Packet extension 410. EHT is an abbreviation for Extremely High Throughput. EHT-SIG-A 405 contains information such as EHT-SIG-A1 and EHT-SIG-A2 required for reception of PPDU. Subfields included in EHT-SIG-A1 and EHT-SIG-A2 in EHT-SIG-A 405 and their descriptions are shown respectively in Table 1 and Table 2.

TABLE 1

| | Bit position | Subfield | Number of bits | Description |
|---|---|---|---|---|
| EHT-SIG-A1 | B0 | Format | 1 | 1 for "FEHT PPDU and EHT ER PPDU" to distinguish from EHT TB PPDU |
| | B1 | Beam Change | 1 | 1 when pre-EHT of PPDU is mapped in a different space from first symbol of EHT-LTF<br>0 when mapped in the same space |
| | B2 | UL/DL | 1 | indicates whether PPDU is for UL or DL, and has the same value as TXVECTOR UPLINK_FLAG |
| | B3-B6 | MCS | 4 | value of Modulation and Coding Scheme<br>n = 0, 1, 2, . . . 11 (12 to 15 are reserved) for EHT SU PPDU<br>n = 0, 1, 2 (3 to 15 are reserved areas) for EHT ER SU PPDU when Bandwidth = 0<br>for EHT ER SU PPDU<br>n = 0, 1, 2 (3 to 15 are reserved areas) when Bandwidth = 0<br>n = 0 (1 to 15 are reserved areas) when Bandwidth = 1 and MCS = 0 |
| | B7 | DCM | 1 | indicates whether Dual Carrier Modulation is applied to data field<br>0 when STBC field is 0<br>(neither applies when both DCM and STBC fields are 1)<br>0 when DCM is not applied |
| | B8-B13 | BSS Color | 6 | 6-bit number that identifies BSS |
| | B14 | Reserved | 1 | reserved area |
| | B15-B18 | Spatial Reuse | 4 | indicates whether Spatial Reuse is allowed when PPDU is being transmitted<br>value of Spatial Reuse field encoding shown in another table is set |
| | B19-B20 | Bandwidth | 2 | in a case of EHT SU PPDU:<br>0 for 20 MHz, 1 for 40 MHz, 2 for 80 MHz, 3 for 160 MHz (80 + 80 MHz) in a case of EHT ER SU PPDU:<br>0 for 242-tone RU, 1 for upper 106-tone RU of primary 20 MHz |
| | B21-B22 | GI + LTF Size | 2 | indicates Guard Interval period and EHT-LTF size<br>0 for 1xEHT-LTF and 0.8 μs GI, 1 for 2xEHT-LTF and 0.8 μs GI<br>2 for 2xEHT-LTF and 1.6 μs GI<br>3 when DCM and STBC fields are both 1 and 4xEHT-LTF and 0.8 μs GI<br>3 for 4xEHT-LTF other than those described above and 3.2 μs GI |
| | B23-B25 | NSTS And Midamble Periodicity | 2 | number of space-time streams and midamble period for frame synchronization<br>when the Doppler field is 0: number of space-time streams − 1<br>when Doppler field is 1: the number of space-time streams is described in B23-24<br>B25 is 0 when the midamble period is 10, 1 when the midamble period is 20 |

TABLE 2

| | Bit position | Subfield | Number of bits | Description |
|---|---|---|---|---|
| EHT-SIG-A2 | B0-B6 | TXOP | 1 | Transmission Opportunity 127 when TXOP_DURATION of XVECTOR is UNSPECIFIED and there is no duration information A value smaller than 127 is set when TXOP_DURATION of TXVECTOR is smaller than 512. When XOP_DURATION of TXVECTOR is smaller than 512, a value smaller than 127 is set to NAV. In this case, when B0 is 0, B1-B6 are FLOOR of (TXOP_DURATION)/ 8 (rounded down). When B0 is 1, B1-B6 are FLOOW of (TXOP_DURATION-512)/8. |
| | B7 | Coding | 1 | 0 for BCC (Binary Convolutional Code), 1 for LDPC (Low Density Parity Check) |
| | B8 | LDPC Extra Symbol Segment | 1 | indicates presence of absence of extra OFDM symbol segment for LDPC |
| | B9 | STBC | 1 | When STBC (Space-Time Block Coding) is used, and DCM IS 0, 1 is set in this field. When neither DCM nor STBC is applied, 1 is also set in this field. In the other cases, 0 is set. |
| | B10 | Beamformed | 1 | 1 when beamforming/steering is applied to SU transmission waveform |
| | B11-B12 | Pre-FEC Padding Factor | 2 | 0, 1, 2, 3 when Pre-FEC Padding Factor is 4, 1, 2, 3 respectively |
| | B13 | PE Disambiguity | 1 | Disambiguity field of Packet Extension |
| | B14 | Reserved | 1 | reserved area |
| | B15 | Doppler | 1 | 1 when either one of the following conditions is met: the number of OFDM symbols in data field is greater than "value indicated by midamble period + 1", and midamble exists the number of OFDM symbols in data field is equal to or smaller than "value indicated by midamble period + 1", and midamble does not exist and channel change is quick |
| | B16-B19 | CRC | 4 | CRC of fields of EHT-SIG-A up to here (for total of 42 bits including 26 bits of A1 and 16 bits of A2 up to B15) |
| | B20-B25 | Tail | 6 | area to set 0 to indicate termination to trellis convolutional decoder |

EHT-SIG-B 406 contains information such as a Common field and a User Block field required to receive PPDU.

EHT-STF 407, located following EHT-SIG-B 406, is an abbreviation for EHT Short Training Field, and its main purpose is to improve automatic gain control in MIMO transmission. EHT-LTF 408 is an abbreviation for EHT Long Training Field, and provides a receiver with means for estimating the MIMO channel. The data field 409 can contain data for MIMO communications transmitted with the number of SS (spatial streams) indicated in an NSTS And Midamble Periodicity subfield of EHT-SIG-A1. In the present embodiment, data fields are read when the BSS Color information included in the EHT-SIG-A field 405 matches the BSS Color information for distinguishing networks constructed by APs participating in Multi-AP communication described later match.

Figure 5:
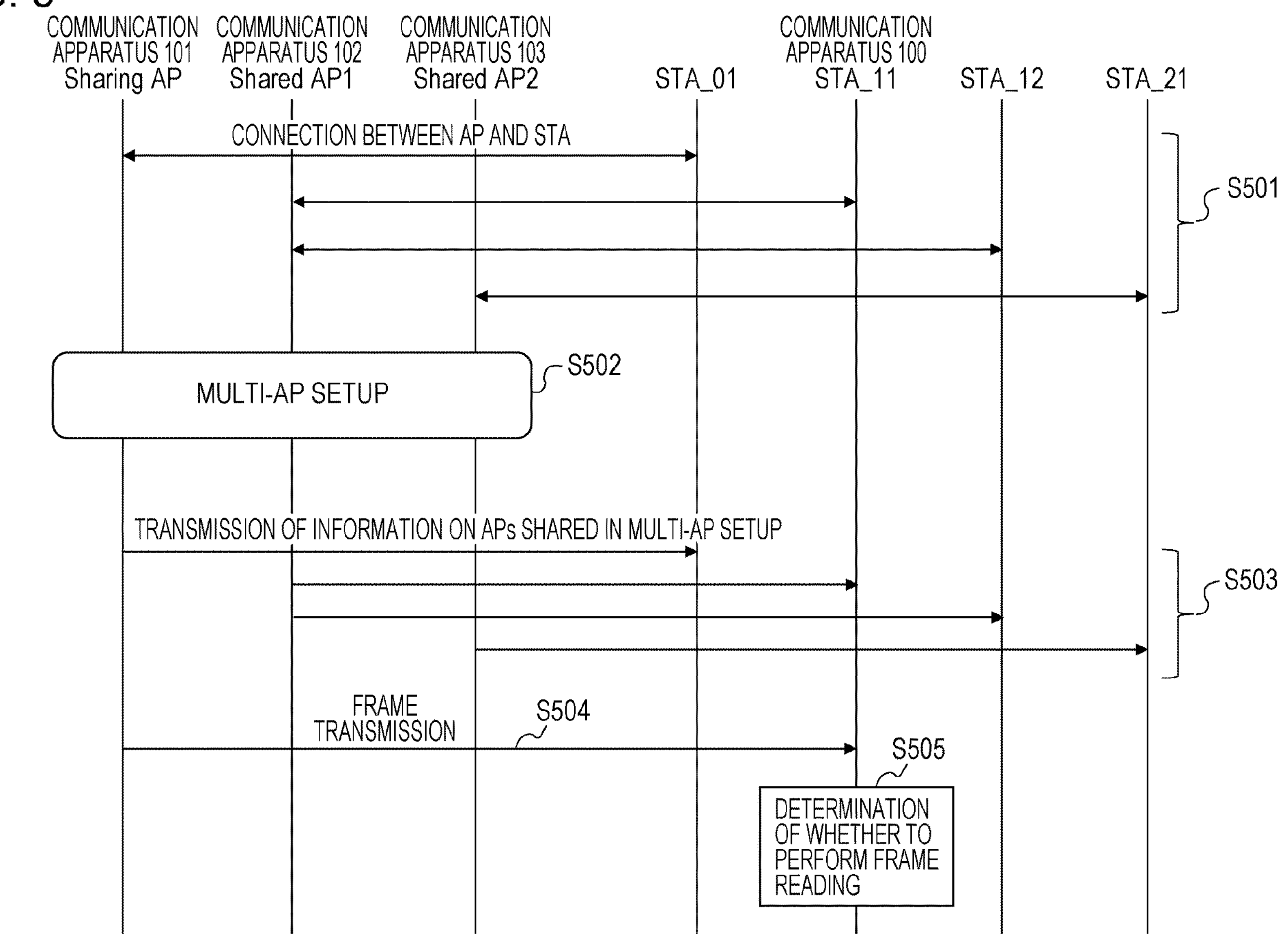
FIG. 5 is a sequence diagram illustrating processing of reading information following a field containing information on a transmission source of a frame transmitted by an AP with which a connection has not been established.

FIG. 5 illustrates a sequence diagram in which the communication apparatus 100 reads a data field of a frame transmitted from an AP with which a connection has not been established. In the present embodiment, the data field is read when a field containing information indicating the source of a frame sent from an AP, with which a connection is not established by the communication apparatus 100, contains information on one of the APs participating in the Multi-AP communication.

In S501, the communication apparatuses 101 to 103 operating as APs perform processing of connecting to the STAs in accordance with the IEEE 802.11 series standards. That is, Probe Request/Response, Association Request/Response, and Authentication Request/Response are transmitted and received between the communication apparatuses 101 to 103 and the STAs, respectively. The communication apparatuses 101 to 103 establish wireless links by transmitting and receiving the above frames to and from the respective STAs. Here, the communication apparatus 101, which is a sharing AP, establishes a connection with STA 01, the communication apparatus 102, which is a shared AP, establishes a connection with the communication apparatus 100 and STA 12, and the communication apparatus 103, which is a shared AP, establishes a connection with STA 21. In S502, a multi-AP communication system setup is performed. The communication apparatus 101, which is a sharing AP in the multi-AP communication system setup, transmits a trigger frame to the communication apparatuses 102 and 103. When the communication apparatuses 102 and 103 receive the trigger frame, the communication apparatuses 102 and 103 transmit a response frame to the communication apparatus 101. The trigger frame is a frame by which the communication apparatus 101 assigns RUs to the respective communication apparatuses 102 and 103, and the communication apparatuses 102 and 103 are urged to transmit specified information to the communication apparatus 101 using the assigned RUs. The response frame includes identification information of STAs that have established connections with the communication apparatuses 102 and 103, the MAC addresses of the communication apparatuses 102 and 103, and information on networks constructed by the communication apparatuses 102 and 103. The identification information of each STA is the MAC address, IP address, or the like of the STA. The information on the networks constructed by the communication apparatuses 102 and 103 is SSID and/or BSSID, BSS Color, etc. Here, BSS is an abbreviation for Basic Service Set. Thus, the communication apparatus 101 serving as the sharing AP collects information on APs participating in the multi-AP communication by receiving response frames. In S502, the communication apparatus 101 determines, based on the information in the response frames transmitted by the communication apparatuses 102 and 103, whether the communication apparatuses 102 and 103 are to participate in the multi-AP communication. Then, the communication apparatus 101 serving as the sharing AP transmits information on the APs participating in the multi-AP communication collected in S502 to the communication apparatuses 102 and 103 which have been determined to participate in the multi-AP communication. This allows the communication apparatuses 102 and 103 serving as the shared APs to get information on the APs participating in the multi-AP communication. Here, the information on each AP participating in the multi-AP communication includes, but is not limited to, the MAC address of the AP, which is the identification information of the AP, the BSS Color which is information for distinguishing the network constructed by the AP, etc.

The communication apparatus 101 transmits information on the APs participating in the multi-AP communication, shared in S502, to the STAs (S503). The information on each AP participating in the multi-AP communication is also transmitted from the AP participating in the multi-AP communication to each STA with which the connection has been established in S501. The information on the APs participating in the multi-AP communication is transmitted from the communication apparatus 101 to STA 01, from the communication apparatus 102 to the communication apparatus 100 and STA 12, and from the communication apparatus 103 to STA 21, respectively. This allows the STAs to know information on the APs participating in the multi-AP communication.

The communication apparatus 101 transmits a frame to the communication apparatus 100, which is an STA with which a connection has not been established (S504). Here, regarding the frame type, the frame may be a management frame, a control frame, or a data frame. Before the communication apparatus 101 transmits a frame, the communication apparatus 101 may perform soundings with each AP and each STA to collect CSI between the APs and STAs thereby capturing the status of the destination communication apparatuses, and then the communication apparatus 101 may transmit the frame. Instead of the CSI, the communication apparatus 101 may capture the status of the destination communication apparatus from the information received in S502 on the STAs that have established connections with communication apparatus 102 and 103. The communication apparatus 100 determines whether to read the frame or not based on the information on the APs participating in the multi-AP communication shared in S503 and the transmission source information included in the frame transmitted by the communication apparatus 101 (S505). The detailed flow in S505 is described below with reference to FIG. 6.

Figure 6:
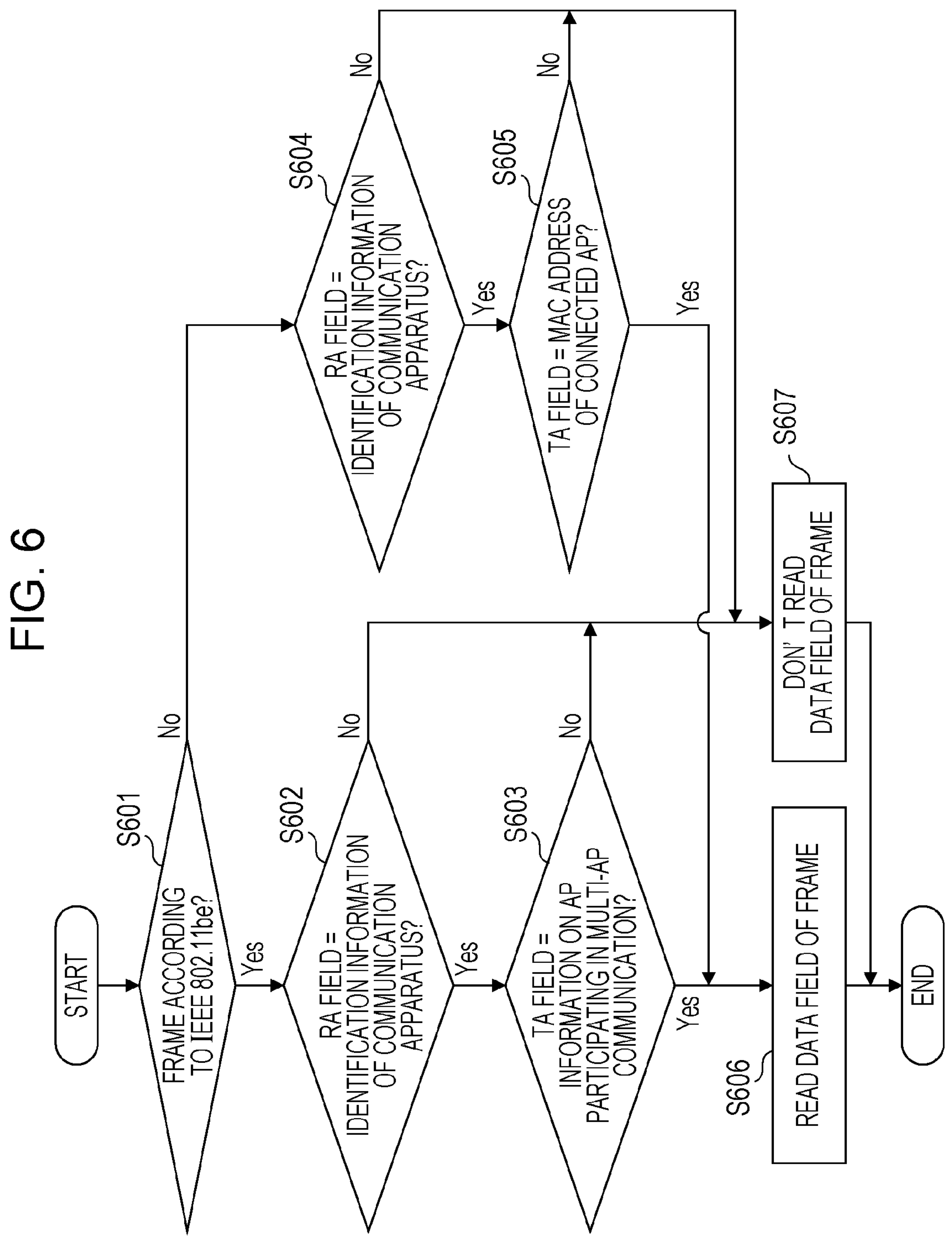
FIG. 6 is a flowchart illustrating processing executed by the communication apparatus 100.

FIG. 6 is a flowchart illustrating the flow of a process performed by the control unit 202 by executing a program stored in the storage unit 201 of the communication apparatus 100. More specifically, this flowchart illustrates the flow of the process of reading data fields contained in the frame transmitted by the communication apparatus 101 with which the connection to the communication apparatus 100 has not been established, wherein the data fields are located after the field containing the information on the transmission source of the frame.

The process of the flowchart begins when the communication apparatus 100 detects the beginning of a frame transmitted by the communication apparatus 101. In the present embodiment, the process of the flowchart is started in response to detecting L-STF at the head of the frame, but this is only by way of example and the head of the frame is not limited to L-STF.

First, in S601, it is determined whether the detected frame type conforms to IEEE 802.11be. The type is determined based on the modulation method and various parameters interpreted in the physical header part of the detected frame. In a case where it is determined in S601 that the frame type does not conform to IEEE 802.11be, it is further determined whether or not the frame destination information included in the RA field of the frame matches the identification information of the communication apparatus 100 (S604). Here, the identification information of the communication apparatus 100 includes, but is not limited to, a MAC address or a broadcast address. In a case where it is affirmatively determined in S604, it is further determined in S605 whether or not the information in the TA field on the transmission source communication apparatus matches the MAC address of the AP that has established the connection with the communication apparatus 100. In a case where it is affirmatively determined in S605, the communication apparatus 100 reads information described after the TA field in the frame transmitted by the communication apparatus 101 (S606). In a case where it is negatively determined in either S604 or S605, the communication apparatus 100 does not read information described after the TA field in the frame transmitted by the communication apparatus 101 (S607).

In a case where it is determined in S601 that the type of the frame conforms to IEEE 802.11be, it is further determined in S602 whether or not the frame destination information included in the RA field of the frame matches the identification information of the communication apparatus 100. Here, the identification information of the communication apparatus 100 includes, but is not limited to, a MAC address or a broadcast address. In a case where it is affirmatively determined in S602, it is further determined whether or not the information contained in the TA field on the transmission source communication apparatus matches the information shared in S503 on one of the APs participating in multi-AP communication. More specifically, it is determined whether the information contained in the TA field of the frame transmitted by the communication apparatus 101 about the transmission source of the communication matches the MAC address of one of the APs participating in the multi-AP communication shared in S503. In a case where it is affirmatively determined in S603, the communication apparatus 100 reads information described after the TA field in the frame transmitted by the communication apparatus 101 (S606). In a case where it is negatively determined in either S602 or S603, the communication apparatus 100 does not read a data field following the TA field in the frame transmitted by the communication apparatus 101 (S607).

In the present embodiment, it is assumed by way of example that the MAC address is used as the information on the AP participating in the multi-AP communication, but alternatively BSS Color may be used. In a case where BSS Color is used, it is determined whether the BSS Color in EHT-SIGA of the frame matches the BSS Color of the network constructed by one of the APs participating in the multi-AP communication shared in S503.

Note that S601 may be omitted. In this case, the process of the flowchart shown in FIG. 6 starts from S602.

According to the present embodiment, the communication apparatus 100 can read data fields located following a field containing information indicating the transmission source of the frame transmitted from another communication apparatus with which a connection has not been established.

According to the embodiment described above, it is assumed by way of example that a communication apparatus having the hardware configuration shown in FIG. 2 executes the process of the flowchart shown in FIG. 6, but the process of the flowchart shown in FIG. 6 may be executed by a wireless chip including the storage unit, the control unit, and the communication unit shown in FIG. 2. That is, in the present embodiment, the communication apparatus may be a wireless chip including the storage unit, the control unit, and the communication unit shown in FIG. 2.

A software program code for realizing the above-described function may be stored in a storage medium and this storage medium may be supplied to a system or an apparatus, and a computer (a CPU, an MPU) of the system or the apparatus may read and execute the software program stored in storage medium. In this case, the program code read from the storage medium implements the functions of the embodiments described above, and the storage medium in which the program code constructs the apparatus described above.

Examples of the storage medium for supplying the program code include a flexible disk, a hard disk, an optical disk, a magneto-optical disk, a CD-ROM, a CD-R, a magnetic tape, a non-volatile memory card, a ROM, a DVD, etc.

In addition to realizing the functions described above by a computer by reading and executing the program code, the functions may also be realized by an OS on which the computer runs by executing part or all of actual processing according to an instruction of the program code. OS is an abbreviation for Operating System.

Furthermore, the functions described above may be realized such that the program code is loaded from a storage medium into a memory provided on a function extension board inserted in a computer or provided in a function extension unit connected to the computer, and part or all of the actual processing may be performed by a CPU disposed on the function extension card or the function extension unit in accordance with an instruction of the loaded program code.

The present disclosure may also be implemented by providing a program for realizing one or more functions of the embodiment to a system or an apparatus via a network or a storage medium, and reading and executing the program by one or more processors in a computer disposed in the system or the apparatus. The present disclosure may also be implemented by a circuit (for example, ASIC) that realizes one or more functions.

The present disclosure is not limited to the above-described embodiments, but various changes and modifications can be made without departing from the spirit and scope of the present disclosure. Therefore, the following claims are appended to make the scope of the present disclosure public.

According to the present disclosure, a communication apparatus is capable of reading a data field of a frame to be read even when the frame is transmitted from an apparatus with which a connection is not established.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. A communication apparatus comprising:

at least one memory that stores a set of instructions; and at least one processor that executes the instructions, the instructions, when executed, causing the communication apparatus to perform operations comprising:

receiving a first predetermined frame transmitted from a first other communication apparatus to the communication apparatus, the first predetermined frame including, in a data field, first information related to a second other communication apparatus, wherein the first information is shared between the first other communication apparatus and the second other communication apparatus, wherein the first other communication apparatus has established a connection with the communication apparatus while the second other communication apparatus has not established a connection with the communication apparatus;

determining whether or not a value of a first field indicating a transmission source of a second predetermined frame matches the first information shared by the first other communication apparatus as a result of the receiving of the first predetermined frame; and in a case where the second predetermined frame is received from a communication apparatus different from the first other communication apparatus and in a case where the transmission source of the second predetermined frame indicated by the first field in the second predetermined frame matches the first information shared by the first other communication apparatus, performing reading a data field included in the second predetermined frame after the first field.

2. The communication apparatus according to claim 1, wherein the first other communication apparatus and the second other communication apparatus each operate as an AP (Access Point) according to the IEEE 802.11 standard series.

3. The communication apparatus according to claim 1, wherein after the first information is shared by the first other communication apparatus as a result of the receiving of the first predetermined frame, the communication apparatus receives signals simultaneously transmitted from an antenna of the first other communication apparatus and an antenna of the second other communication apparatus based on a distributed MIMO (Multi-Input Multi-Output) technique, and the communication apparatus acquires, from these signals, data transmitted cooperatively by the first other communication apparatus and the second other communication apparatus.

4. The communication apparatus according to claim 1, wherein the second predetermined frame further includes a second field containing second information which is identification information of an apparatus that is a destination of the second predetermined frame, and the communication apparatus reads the data field included, in the second predetermined frame, following the first field in a case where the second information matches the identification information of the communication apparatus and it is determined that the first information is included in the first field.

5. The communication apparatus according to claim 4, wherein the second information is a MAC address or a broadcast address of the apparatus which is the destination of the second predetermined frame.

6. The communication apparatus according to claim 4, wherein the second field is an RA (Receiver Address) field.

7. The communication apparatus according to claim 1, wherein each of the first predetermined frame and the second predetermined frame is a frame according to an IEEE 802.11 standard series.

8. The communication apparatus according to claim 1, wherein the first information is an MAC address of the second other communication apparatus, or BSS (Basic Service Set) Color which is information for distinguishing a wireless network that the second other communication apparatus constructs.

9. The communication apparatus according to claim 1, wherein the first field is a TA (Transmitter Address) field or a signal field related to EHT (Extremely High Throughput).

10. A non-transitory computer-readable storage medium storing a computer program for causing a computer to execute a method of controlling a communication apparatus, the method comprising:

receiving a first predetermined frame transmitted from a first other communication apparatus to the communication apparatus, the first predetermined frame including, in a data field, first information related to a second other communication apparatus, wherein the first information is shared between the first other communication apparatus and the second other communication apparatus, wherein the first other communication apparatus has established a connection with the communication apparatus while the second other communication apparatus has not established a connection with the communication apparatus;

determining whether or not a value of a first field indicating a transmission source of a second predetermined frame matches the first information shared by the first other communication apparatus as a result of the receiving of the first predetermined frame; and performing reading such that in a case where the second predetermined frame is received from a communication apparatus different from the first other communication apparatus and in a case where the transmission source of the second predetermined frame indicated by the first field in the second predetermined frame matches the first information shared by the first other communication apparatus, a data field included in the second predetermined frame after the first field is read.

11. A control method for a communication apparatus, comprising:

receiving a first predetermined frame transmitted from a first other communication apparatus to the communication apparatus, the first predetermined frame including, in a data field, first information related to a second other communication apparatus, wherein the first information is shared between the first other communication apparatus and the second other communication apparatus, wherein the first other communication apparatus has established a connection with the communication apparatus while the second other communication apparatus has not established a connection with the communication apparatus;

determining whether or not a value of a first field indicating a transmission source of a second predetermined frame matches the first information shared by the first other communication apparatus as a result of the receiving of the first predetermined frame; and performing reading such that in a case where the second predetermined frame is received from a communication apparatus different from the first other communication apparatus and in a case where the transmission source of the second predetermined frame indicated by the first field in the second predetermined frame matches the first information shared by the first other communication apparatus, a data field included in the second predetermined frame after the first field is read.

* * * * *